(12) United States Patent
Zeng et al.

(10) Patent No.: US 10,651,960 B2
(45) Date of Patent: May 12, 2020

(54) RELAY CONTROL CHANNEL SEARCH SPACE CONFIGURATION

(75) Inventors: Erlin Zeng, Beijing (CN); Gilles Charbit, Hampshire (GB); Jing Han, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 282 days.

(21) Appl. No.: 13/639,503

(22) PCT Filed: Apr. 7, 2010

(86) PCT No.: PCT/CN2010/071620
§ 371 (c)(1),
(2), (4) Date: Jun. 28, 2013

(87) PCT Pub. No.: WO2011/124028
PCT Pub. Date: Oct. 13, 2011

(65) Prior Publication Data
US 2013/0265934 A1    Oct. 10, 2013

(51) Int. Cl.
*H04J 4/00* (2006.01)
*H04L 5/00* (2006.01)
(Continued)

(52) U.S. Cl.
CPC ............ *H04J 4/00* (2013.01); *H04B 7/15528* (2013.01); *H04L 5/0023* (2013.01);
(Continued)

(58) Field of Classification Search
CPC ... H04J 4/00; H04J 2013/0088; H04L 5/0053; H04L 2001/0097; H04L 27/2602;
(Continued)

(56) References Cited

U.S. PATENT DOCUMENTS 8,270,359 B2 *   9/2012   Nangia et al. ................ 370/329
2008/0310353 A1 * 12/2008   Love et al. .................... 370/329
(Continued)

FOREIGN PATENT DOCUMENTS

EP   2429096 A2    3/2012
WO   02/089441 A1  11/2002
(Continued)

OTHER PUBLICATIONS

3GPP TS 36.213 V9.1.0 (Technical Specification)3rd Generation Partnership Project;Technical Specification Group Radio Access Network;Evolved Universal Terrestrial Radio Access (E-UTRA); Physical layer procedures (Release 9), (Mar. 2010), 79 Pages.*
(Continued)

*Primary Examiner* — Ivan O Latorre
(74) *Attorney, Agent, or Firm* — Squire Patton Boggs (US) LLP

(57) ABSTRACT

A method, apparatus, and computer-readable medium are provided for implementing a control channel on a backhaul link of a relay system. The method can include, for example, hybrid time division multiplexing and frequency division multiplexing a relay-physical downlink control channel and relay-physical downlink shared channel of a backhaul link for a relay node as a hybrid multiplexed set of symbols. The relay-physical downlink control channel can include a semi-statically configured searching space to be searched by the relay node. The method can also include transmitting the hybrid multiplexed set of symbols to the relay node.

28 Claims, 9 Drawing Sheets

(51) Int. Cl.
| | |
|---|---|
| *H04B 7/155* | (2006.01) |
| *H04L 1/00* | (2006.01) |
| *H04W 72/04* | (2009.01) |
| *H04W 84/04* | (2009.01) |

(52) U.S. Cl.
CPC .... *H04L 5/0053* (2013.01); *H04L 2001/0097* (2013.01); *H04W 72/04* (2013.01); *H04W 84/047* (2013.01)

(58) Field of Classification Search
CPC .... H04L 5/0091; H04L 5/0023; H04W 72/04; H04W 84/047; H04W 48/12; H04W 5/0051; H04W 5/0057; H04B 7/0486; H04B 7/0639; H04B 7/15528
USPC ....... 370/315, 335, 329, 328, 312, 330, 336, 370/252; 375/340, 260, 267; 455/70, 455/434, 450, 452.1, 452.2, 509; 714/748
See application file for complete search history.

(56) References Cited

U.S. PATENT DOCUMENTS

| | | | | |
|---|---|---|---|---|
| 2009/0088148 | A1* | 4/2009 | Chung et al. | 455/423 |
| 2009/0262856 | A1* | 10/2009 | Onggosanusi et al. | 375/267 |
| 2010/0027456 | A1* | 2/2010 | Onggosanusi et al. | 370/312 |
| 2010/0061345 | A1* | 3/2010 | Wengerter et al. | 370/335 |
| 2010/0115358 | A1* | 5/2010 | Kotecha et al. | 714/748 |
| 2010/0157922 | A1* | 6/2010 | Kim et al. | 370/329 |
| 2010/0254301 | A1* | 10/2010 | Blankenship | H04W 72/085 370/315 |
| 2010/0279628 | A1* | 11/2010 | Love | H04L 5/003 455/70 |
| 2010/0281323 | A1* | 11/2010 | Wang et al. | 714/748 |
| 2011/0019776 | A1* | 1/2011 | Zhang | H04L 5/0023 375/340 |
| 2011/0021206 | A1* | 1/2011 | Baker | H04W 88/08 455/450 |
| 2011/0038275 | A1* | 2/2011 | Kim et al. | 370/252 |
| 2011/0103295 | A1* | 5/2011 | Khandekar et al. | 370/315 |
| 2011/0201333 | A1* | 8/2011 | Kwon | H04L 5/0091 455/434 |
| 2011/0249629 | A1* | 10/2011 | Ko et al. | 370/329 |

FOREIGN PATENT DOCUMENTS

| | | |
|---|---|---|
| WO | 2005/125107 A1 | 2/2005 |
| WO | 2005/053186 A1 | 6/2005 |
| WO | 2008/027344 A2 | 3/2008 |

OTHER PUBLICATIONS

3GPP TSG RAN WG1 Meeting #59, R1-094593, Samsung, "R-PDCCH Multiplexing and Search Space", Nov. 2009, 4 Pages.*
3G Americas, "MIMO Transmission Schemes for LTE and HSPA Networks", Jun. 2009, 50 Pages.*
Panasonic, "DCI format and blind decoding for LTE-Advanced", Nov. 2009, 3GPP TSG-RAN WG1 Meeting #59, R1-094497, 5 Pages.*
Russian Office Action dated Jan. 24, 2014, issued in corresponding RU 2012146411, 7 pages.
Chinese Office Action dated Nov. 3, 2014, issued in corresponding Chinese Patent Application No. 201080067025.3, 13 pages.
Indonesian Office Action, issued in corresponding Indonesian Patent Application No. WOO 2012 04140, 2 pages.
Russian Office Action, dated Nov. 12, 2015, issued in corresponding Patent Application No. RU 2014141888, 2 pages.
Panasonic: "R-PDCCH placement", 3GPP TSG RAN WG1 Meeting #60bis, Beijing, China, Apr. 12-16, 2010, 3rd Generation Partnership Project (3GPP), R1-102042, Mobile Competence Centre; 650, Route Des Lucioles, F-06921 Sophia-Antipolis Cedex, France, vol. RAN WG1, No. Beijing, China; Apr. 12, 2010, Retrieved on Apr. 6, 2010, XP050419373.
Interdigital Communications et al: "Link-level results for R-PDCCH multiplexing using FDM and TDM +FDM", 3GPP TSG-RAN WG1 Meeting #60, Feb. 22-26, 2010, San Francisco, CA, R1-101532, 3rd Generation Partnership Project (3GPP), Mobile Competence Centre, 650, Route Des Lucioles, F-06921 Sophia-Antipolis Cedex, France, vol. RAN WG1, No. San Francisco, USA, Feb. 22, 2010, Retrieved on Feb. 16, 2010, XP050418967.
NEC Group: "R-PDCCH blind decoding for Frequency Diversity and Frequency Selective R-PDCCH transmissions", TSG-RAN WG1 #60Bis, Beijing, P.R. China, Apr. 12-16, 2010, R1-102268, 3rd Generation Partnership Project (3GPP), Mobile Competence Centre, 650, Route Des Lucioles, F-06921 Sophia-Antipolis Cedex, France, vol. RAN NG1, No. Beijing, China, Apr. 12, 2010, Retrieved on Apr. 6, 2010, XP050419527.
ZTE: "R-PDCCH Multiplexing and Relevant Problems", TSG-Ran WG1 #60, San Francisco, CA, USA, Feb. 22-26, 2010, R1-100975, 3rd Generation Partnership Project (3GPP), Mobile Competence Centre, 650, Route Des Lucioles, F-06921 Sophia-Antipolis Cedex, France, vol. RAN WG1, No. San Francisco, USA, Feb. 22, 2010, Retrieved on Feb. 16, 2010, XP050418557.
Extended European Search Report issued in corresponding European Application No. 10849265.3 dated Mar. 20, 2017.
Indonesian Office Action issued in corresponding Indonesian Patent Application No. WOO 2012 04140 dated Feb. 1, 2018.
Extended European Search Report corresponding the Appln. No. 18209544.8, dated Feb. 26, 2019.

* cited by examiner

Example of R-PDCCH & R-PDSCH multiplexing

Figure 2A

Number of REs in a PRB for R-PDCCH mapping $N\_RE = 48 - 4 = 44$

| | symbol #3-4 | symbol #5-6 |
|---|---|---|
| PRB #k | CCE #1 | CCE #2 |
| PRB #k+1 | | |

(a) two CCEs mapped to PRB #k

| | symbol #3-4 | symbol #5-6 |
|---|---|---|
| PRB #k | CCE #1 | |
| PRB #k+1 | CCE #2 | |

(b) two CCEs mapped to PRB pair #k and #k+1

| | symbol #3-4 | symbol #5-6 |
|---|---|---|
| PRB #k | CCE #1 | CCE #3 |
| PRB #k+1 | CCE #2 | CCE #4 |

(c) Four CCEs mapped to PRB pair #k and #k+1

Examples of CCE mapping to physical resources

Figure 3

Cases for TDM and SDM of R-PDCCH and R-PDSCH in a PRB with SU MIMO

DM RS port –DL MIMO WI

RELAY CONTROL CHANNEL SEARCH SPACE CONFIGURATION

RELATED APPLICATION

This application was originally filed as PCT Application No. PCT/CN2010/071620 filed Apr. 7, 2010.

BACKGROUND

Field

Telecommunications systems that employ a relay node can benefit from relay control channel search space configuration. In particular, such systems can benefit from improved search space design and potential reductions in the amount of blind detections for a relay node.

Description of the Related Art

Relay is one approach to extend cell coverage and enhanced cell capacity with a low cost for the Long Term Evolution Advanced (LTE-A) system. There are many kinds of relays relevant to the Third Generation Partnership Project (3GPP) which might be applicable to difference scenarios. In particular, relays can be classified as "type 1" or "type 2." A type 1 relay is an inband relay, which can use the same frequency band for a backhaul link and an access link. A type 2 relay, in contrast, is an outband relay, which can use a different frequency band for the backhaul link and the access link.

A relay node (RN), sometimes itself called the "relay," can be in control of cells of its own. These cells can appear to a user equipment (UE) as separate cells from the donor cell. The donor cell can be the cell of the base station, such an evolved node B (eNB), to which the RN is connected. Furthermore, each of the UEs connected to the RN can likewise be referred to as relay nodes. A unique physical-layer cell identity (ID) can be provided in each of the cells of the RN. The RN can transmit its own synchronization channels, reference symbols, and the like. The UE can receive scheduling information and hybrid automatic repeat request (HARQ) feedback directly from the relay node and send its control channels—scheduling request (SR), channel quality indicator (CQI), and acknowledgment (ACK)—to the relay node.

For type 1 relays, in may be useful to define a relay-physical downlink (DL) control channel (R-PDCCH) for the backhaul. However, little has been conventionally done to treat the R-PDCCH search space over the DL backhaul subframe. The R-PDCCH on the DL backhaul subframe may begin, for example, on the fourth orthogonal frequency division multiplexing (OFDM) symbol. Furthermore, cell-specific reference signals (CRS) and demodulation reference signals (DM RS) may be used over the DL backhaul subframe.

SUMMARY

The present invention, in one embodiment, is a method. The method includes hybrid time division multiplexing and frequency division multiplexing a relay-physical downlink control channel and relay-physical downlink shared channel of a backhaul link for a relay node as a hybrid multiplexed set of symbols. The relay-physical downlink control channel comprises a searching space with parameters semi-statically configured to be searched by the relay node. The method also includes transmitting the hybrid multiplexed set of symbols to the relay node.

Another embodiment of the present invention is an apparatus. The apparatus includes at least one memory including computer program code and at least one processor. The at least one memory and the computer program code are configured to, with the at least one processor, cause the apparatus at least to hybrid time division multiplex and frequency division multiplex a relay-physical downlink control channel and relay-physical downlink shared channel of a backhaul link for a relay node as a hybrid multiplexed set of symbols. The relay-physical downlink control channel comprises a searching space with parameters semi-statically configured to be searched by the relay node. The at least one memory and the computer program code are also configured to, with the at least one processor, cause the apparatus at least to transmit the hybrid multiplexed set of symbols to the relay node.

A further embodiment of the present invention is a computer-readable non-transitory medium encoded with instructions that, when executed in hardware, perform a process. The process includes hybrid time division multiplexing and frequency division multiplexing a relay-physical downlink control channel and relay-physical downlink shared channel of a backhaul link for a relay node as a hybrid multiplexed set of symbols, wherein the relay-physical downlink control channel comprises a searching space with parameters semi-statically configured to be searched by the relay node. The process also includes transmitting the hybrid multiplexed set of symbols to the relay node.

BRIEF DESCRIPTION OF THE DRAWINGS

For proper understanding of the invention, reference should be made to the accompanying drawings, wherein:

FIG. 2A-2C illustrates a number of resource elements (REs) in a physical resource block (PRB) for relay-physical downlink control channel (R-PDCCH) mapping.

FIG. 3 illustrates an example of control channel element (CCE) mapping to physical resources.

DETAILED DESCRIPTION OF THE PREFERRED EMBODIMENT(S)

The following discussion provides, for example, a hybrid time division multiplexed (TDM) and frequency division multiplex (FDM) scheme for relay-physical downlink (DL) control channel (R-PDCCH) and relay-physical DL shared channel (R-PDSCH) multiplexing.

Figure 1:
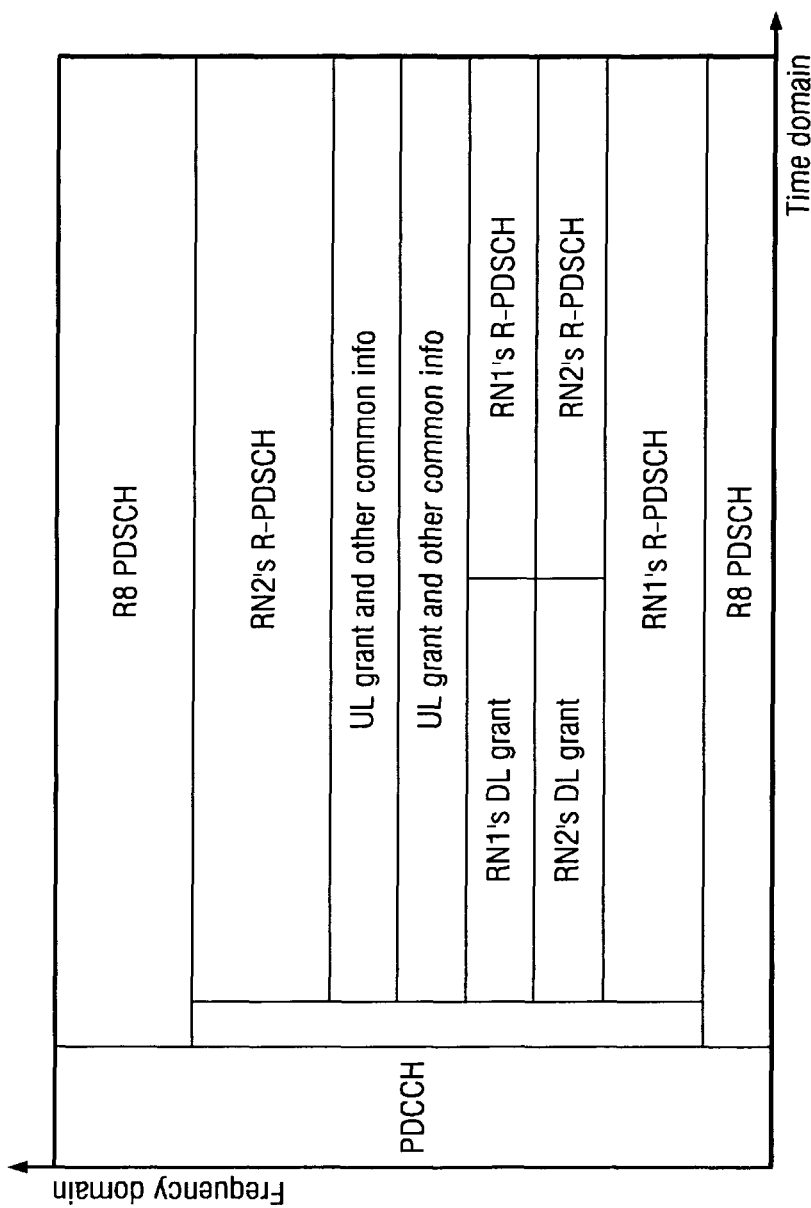
FIG. 1 illustrates an example of relay-physical downlink control channel (R-PDCCH) and relay-physical downlink shared channel (R-PDSCH) multiplexing.

FIG. 1 illustrates an example of a TDM+FDM hybrid multiplexing scheme for R-PDCCH & R-PDSCH multiplexing. The multiplexing scheme as shown in FIG. 1 is illustrated on time domain and frequency domain axes.

As shown in FIG. 1, in the time domain, the multiplexing may begin by providing a PDCCH. Then, while release 8 (R8 or Rel-8) PDSCH is proceeding, a variety of other channels, including relay node 1 (RN1)'s R-PDSCH, RN2's R-PDSCH, UL grant and other common information, and RN1's and RN2's DL grants are multiplexed using frequency division multiplexing.

In short, one RN's R-PDCCH may be time division multiplexed (TDMed) with its R-PDSCH in a given physical resource block (PRB) to allow for early decoding of the control information. This may help providing a larger decoding budget for R-PDSCH. A larger decoding budget can make the RN hardware implementation simpler. Another benefit that may accrue from such an implementation is that precoding gain may be available not only for the data but also for the control channel over the backhaul. With R-PDCCH rank higher than one, the control channel capacity can be improved so that more resources can be saved for data traffic. It is flexible in the sense that downlink control information (DCI) in R-PDCCH can allocate a number of physical resource blocks (PRBs) which are exclusively for the R-PDCCH. In the following we name the PRBs containing both R-PDCCH and R-PDSCH as "partial" PRBs for R-PDSCH, while the above mentioned pure R-PDSCH PRBs as "full" PRB.

Under such architecture, details such as R-PDCCH search space design and resource allocation for both R-PDCCH and R-PDSCH can be considered. Points at which such an architecture may differ from Rel-8 are that R-PDCCH and R-PDSCH may be TDMed and SDMed in one PRB and the rank of R-PDCCH is not limited to be one.

There are also other aspects that can be considered. For example, the rank and modulation scheme can be different for the multiplexed R-PDCCH and R-PDSCH in the same PRB. Some of the PRBs for R-PDSCH may be allocated all of the symbols available for backhaul in the PRB. This may be referred to as a "full" PRB scenario. In contrast, others may only use "partial" PRBs. The partial PRBs may be due the presence of R-PDCCH there.

The above aspects can have impact on R-PDCCH search space design, with search complexity in mind. Also they can impact the way that a donor evolved Node B (DeNB) determines a modulation and coding scheme (MCS) for R-PDSCH. The aspects can further impact the way the relay node (RN) determines transport block (TB) size. Such multiplexing can be designed to be efficient and keep the number of blind decoding attempts for the R-PDCCH over the DL backhaul link sufficiently low for practical implementation. For such designs priorities can be put into embodiments that involve lower implementation and standardization effort.

The following discussion, regarding R-PDCCH search space, may be primarily applicable to a case without joint interleaving among several RNs' R-PDCCHs. In other words, this discussion may particularly application to localized mapping without any joint interleaving. The search space can be RN common or specific. In the case of specific, the search space for RNs can overlap.

The R-PDCCH searching space can be defined as a set of parameters in the following: PRB Candidate Set S; Rank for R-PDCCH R, Control Channel Element (CCE) aggregation level L; and demodulation (DM) reference signal (RS) port index P in cases where R-PDCCH is based on DM RS.

For example, the set S may contain several possible PRB sets, for example, S={[k], [#j], [#k, #k+1], [#j+1],[#l, #j], ... }, which means that for the RN, R-PDCCH can be possibly mapped to PRB #k, or #j, or the PRB pair #k and #k+1, and so on. The set S can be predefined and configurable for the RN to achieve a balance between R-PDCCH scheduling flexibility RN's search effort. The configuration of S could be based on RRC signaling or media access control (MAC) signaling.

Rank R can be predefined as R=1 or R=2 and so on. There are at least two ways for defining R in search space, for example, a) the value of R is semi-statically configured for the RN via e.g., RRC signaling, or b) the value of R is not configured explicitly but is linked to another parameter such as S or L. In a further alternative, the value of R is not linked to another value but instead relies on RN's blind search over all possible ranks for R-PDCCH.

The search space can contain several possible CCE aggregation levels, for example, L={1, 2 ... }, depending on search complexity. For each candidate within the set S, the RN can try blind detection through one or multiple possible values within set L. At least one way for the RN to decide the one or multiple possible values within set L for blind search is that the RN only needs to try the blind detection when the aggregation level is larger than the number of PRB(s) in the candidate within the set S. The RN can assume the control channel elements (CCEs) are mapped to the PRB(s) defined by the set S in a certain way, e.g., time first or frequency first.

The DM RS port index can be P={[#0], [#1], [#0, #1], ..., [#0, #1 ... #M-1]} assuming maximum M DM RS ports are available for R-PDCCH. To reduce search complexity, P can be defined to be a limited subset of the maximum possible combinations of all DM RS ports.

Several considerations can help to design R-PDCCH search space effectively. The rank of R-PDCCH transmission R, e.g., one or two, can be preconfigured by higher layer signaling, implicitly linked to other parameters like S or/and L, or blindly detected by a RN. For the former two cases, the search complexity for RN can be lower.

Additionally, CCE aggregation level L and rank R can be linked with each other in such a way that larger number of CCEs are aggregated when rank of R-PDCCH is low, or smaller number of CCEs are aggregated when rank of R-PDCCH is high. Such linkage can reduce the search complexity for a RN.

Furthermore, a default search candidate, for example, predefined PRBs, rank one, CCE level and DM RS port can be included in the search space to handle signaling failure. Specifically, the DM RS port in case of Rank 1 can be predefined to reduce the search complexity. For example, DM RS port index can be defined as P={[#0]}. Alternatively, P={[#1]} can be used when R-PDCCH is configured as rank one. In such a way there may be no need for the RN to try blind detection over other DM RS ports.

The ending point, in time, of a R-PDCCH resource can mapped to physical resources by CCE aggregation level. For example, for each candidate in S, the RN can try blind decoding for one or multiple possible CCE aggregation levels in L. Once the R-PDCCH is detected in certain PRB(s), the maximum R-PDCCH ending point in time can be in an embodiment at symbol #6, and the R-PDCCH ending point in time-domain of specific relay can be determined by number of CCEs utilized.

Resources starting from the R-PDCCH ending point to the end of the backhaul subframe in the same PRB can be allocated for R-PDSCH for the same RN. When R-PDSCH has rank two and R-PDCCH has rank one, the other layer not used by R-PDCCH in the first several OFDM symbols of the PRB can be allocated to R-PDSCH.

The DCI in R-PDCCH can indicate the allocated PRB set B so that PRBs within B do not contain any R-PDCCH. The RN, upon detection of R-PDCCH in PRB set A can assume R-PDSCH for it are mapped to two sets of resources. Specifically, the RN can assume R-PDSCH for it are mapped to a) PRB set B containing a number of "full" PRBs, and b) PRB set A containing a number of "partial" PRBs, the part not used by R-PDCCH. Note that A can be an element within set S defined by the search space.

The RN, upon identifying the above set A and B, can assume the following when determining transport block (TB) size based on PRB number and MCS index: the total number of PRB allocated for R-PDSCH is |A|+|B|, or the total number of PRB allocated for R-PDSCH is |B|. One of these two ways of determining TB size can be utilized by RN according to the indication of DeNB. Such indication can be either via higher layer signaling or via L1 DL signaling. An alternative way is that only one way is predefined and in this case there would be no need for specifying another. The DeNB can be in control and thus can know which method the RN will use for TB size determination. Consequently, the DeNB can be able to efficiently select the MCS for R-PDSCH.

Example embodiments of the invention for single user (SU) multiple input multiple output (MIMO) will now be described.

Signaling for the PRB candidate set S is one consideration. The PRB candidate set S, which is the set of the PRBs that can possibly be used for R-PDCCH for a specific relay, can be configured by high layer signaling, for example, radio resource control (RRC) signaling or MAC signaling. If this set is very large the result may be much searching effort for the relay. If this set is small, it may limit R-PDCCH/R-PDSCH scheduling for the relay. Thus, the signaling for set S can be carefully selected to balance between searching complexity and scheduling limitation or set S updating frequency.

The following are some possible options for signaling design for PRB candidate set S: static set S or slowly update set S. In the static set S option, the static set S can be a predefined, big-enough set for a specific relay. Thus, there may be no need to update the set during a given time period. The set could be predefined by rules, for example based on the relay index etc. Alternatively, the set could be configured by the high layer signaling at the initial access to DeNB. This way could decrease the searching load effectively.

In the slowly updated set S option, a basic set could be predefined or signaled at initial access to DeNB. Subsequently, a delta or changes part could be updated by high layer signaling. This way could further decrease the searching load and maintain the scheduling flexibility at the same level. The cost of this option is that there may be need high layer signaling to indicate the update of delta part.

Figure 2A:
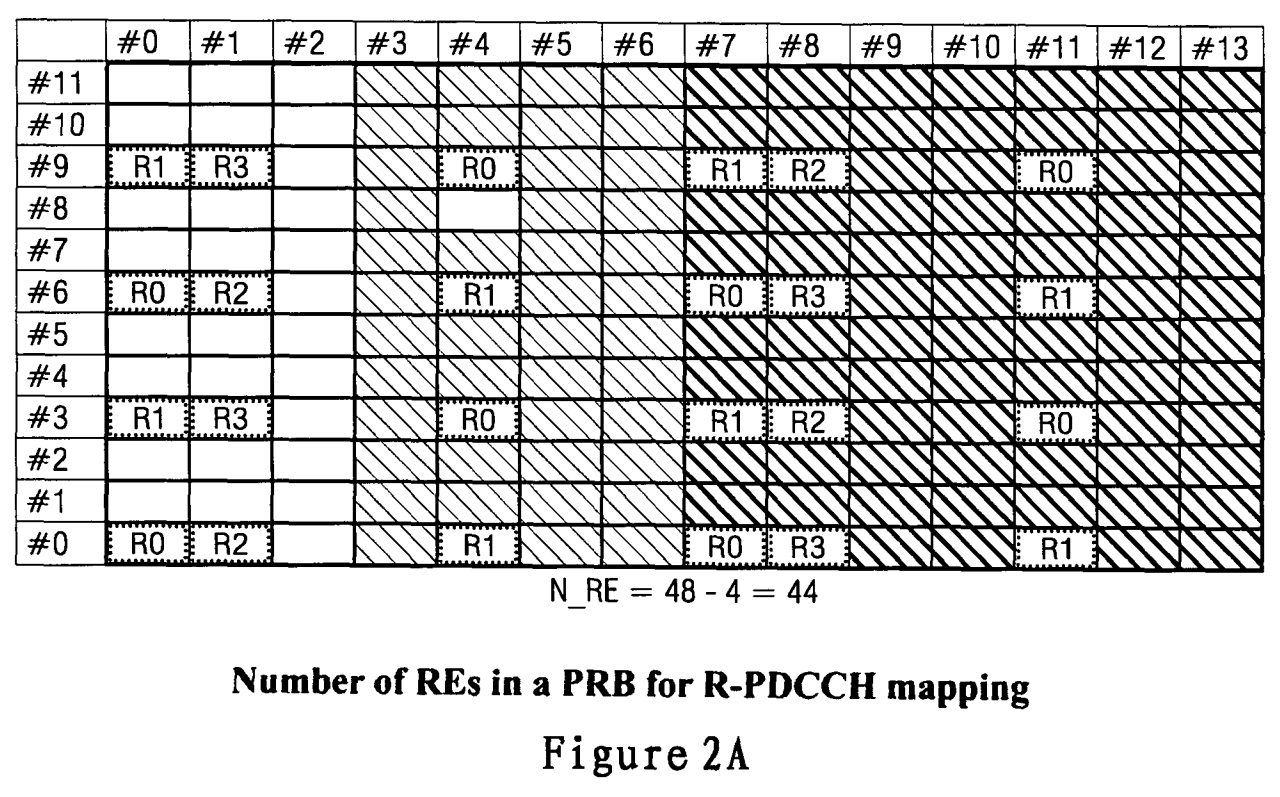
Figure 2B:
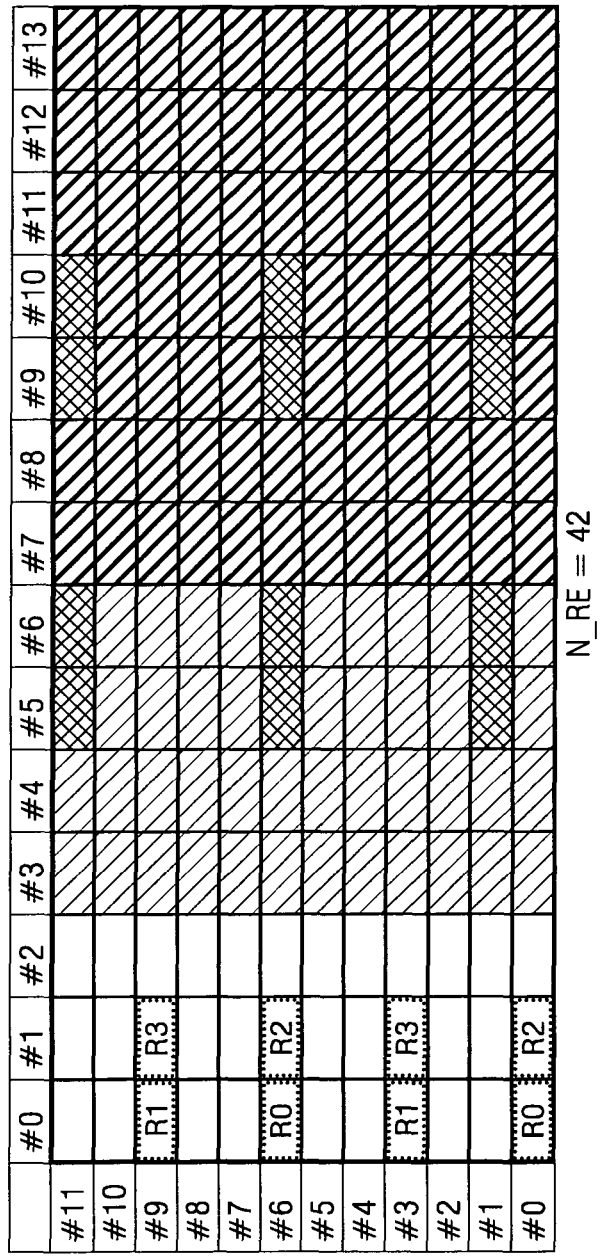
Figure 2C:
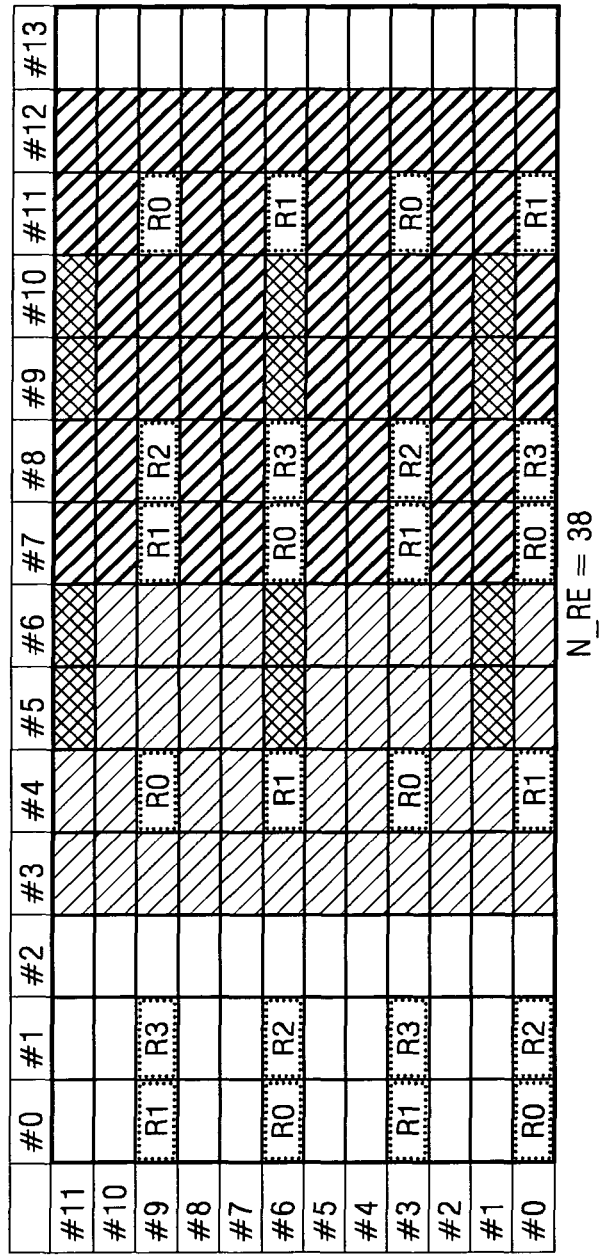

Another consideration is CCE size. One way of defining CCE size for R-PDCCH is that it is set to be equal to the number of resource elements (REs) in two orthogonal frequency division multiplexed (OFDM) symbols in a PRB not including any REs for a reference signal (RS). The number of REs per PRB can be linked with the RS mode—i.e. cell specific (CRS) or DM RS—and can be assumed to be known implicitly by the RN, for example, via higher layer configured transmission mode. Assuming R-PDCCH starts from a fourth OFDM symbol (OFDM symbol #3), one CCE in this case contains these 24 REs in a PRB assuming rank 1 for R-PDCCH for the cases without any REs used for RS. In cases where RS REs are present in the two PRBs of a CCE, the RN can assume that these REs are considered punctured during R-PDCCH encoding and rate matching. In such a way, the maximum number of CCEs per PRB within the 1st slot can be fixed. For example, the fixed number is two in the example shown in FIG. 2A-2C. Other possible CCE sizes are also possible for R-PDCCH, and could have a similar design as CCE with the two PRBs size.

FIG. 3 illustrates an example of mapping CCEs to physical resources assuming the R-PDCCH has a rank of one. In practice RN may only need to try the CCE aggregation levels that are equal or larger than the number of PRBs. For the example shown in FIG. 3(b), the remainder part of symbols within the first slot can be available for R-PDSCH. FIG. 3(a) illustrates two CCEs mapped to PRB #k. CCE #1 is in symbols #3-4 and CCE #2 is in symbols #5-6.

FIG. 3(b) illustrates two CCEs mapped to pair #k and #k+1. CCE #1 is mapped to PRB #k and CCE #2 is mapped to PRB #k+1. Both CCEs are in symbols #3-4. FIG. 3(c) shows four CCEs mapped to PRB pair #k and #k+1. CCE #1 is mapped to PRB #k, symbols #3-4. CCE #2 is mapped to PRB #k+1, symbols #3-4. CCE #3 is mapped to PRB #10-1, symbols #5-6. Finally, CCE #4 is mapped to PRB #k+1, symbols #5-6.

The number of spatial layers for hybrid R-PDCCH and R-PDSCH multiplexing method is another consideration. The R-PDCCH may have a maximum rank of two, and the DM RS ports available for use for R-PDCCH may be P={[#0], [#1], [#0, #1]}. Note that here the port index #0 or #1 can be different from the physical port index, considering that several antenna ports may be defined for CRS and DM RS.

An example of mapping CCEs to physical resources assuming the R-PDCCH has a rank of two may be obtained from FIG. 3(a) by mapping four CCEs to PRB #k. CCE #1 is in symbol #3, CCE #2 is in symbol #4, CCE #3 is in symbol #5, and CCE #4 is in symbol #6. With reference to FIG. 3(b), four CCEs can be mapped to pair #k and #k+1. CCE #1 and CCE#2 are mapped to PRB #k in symbol #3 and #4 and CCE #3 and CCE#4 are mapped to PRB #k+1 in symbol #3 and #4. A higher layer CCE aggregation level of eight may readily be obtained with reference to FIG. 3(c) assuming R-PDCCH of rank 2. The described method of CCE mapping to physical resources is not limited to R-PDCCH or rank one or two and may herein be extended to R-PDCCH of rank higher than two.

Figure 4:
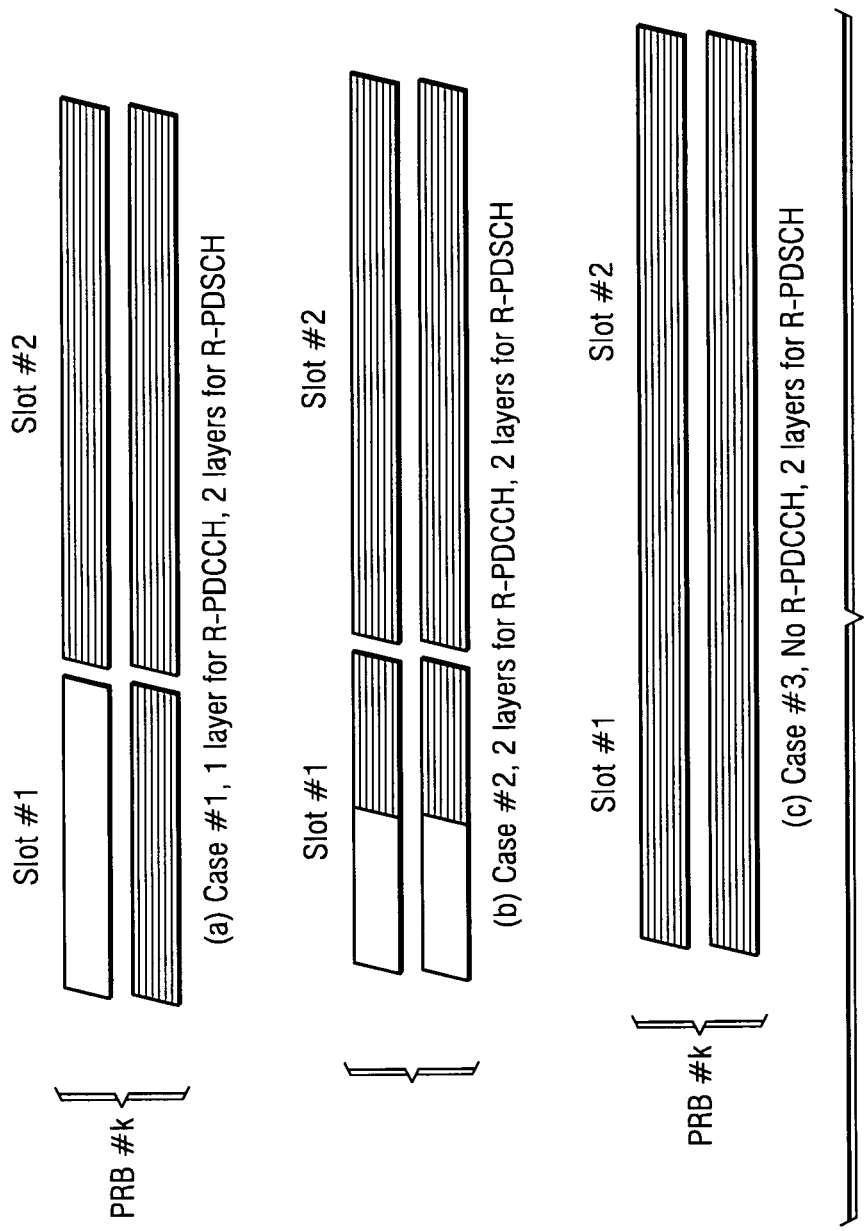
FIG. 4 illustrates cases for time division multiplexing (TDM) and spatial division multiplexing (SDM) of relay-physical downlink control channel (R-PDCCH) and relay-physical downlink shared channel (R-PDSCH) in a physical resource block (PRB) with single-user (SU) multiple-input multiple-output (MEMO).

Time division multiplexing (TDM) and spatial division multiplexing (SDM) of R-PDCCH and R-PDSCH in a PRB are possible as illustrated, for example, in FIG. 4. Case #1 of FIG. 4(a) has one layer only for R-PDCCH but two layers for R-PDSCH. Case #2 of FIG. 4(b) has two layers for R-PDCCH and two layers for R-PDSCH. Case #3 of FIG. 4(c) has no R-PDCCH yet has two layers for R-PDSCH.

The start symbol of R-PDCCH may be fixed to OFDMA symbol three (OS#3) in the 1st slot. The end symbol for R-PDCCH may not be fixed and could be any other symbols (OS#4, 5, 6) in the 1st slot of the PRB depending on the CCE size. For the CCE size used above, the ending point can be #4 or #6. To limit the amount of CCE aggregation in the Time Domain, in an example embodiment, a number of approaches can be used.

Rank-1 R-PDCCH can be mapped to OS#3, 4, 5, 6 with 2 CCEs aggregation as illustrated in FIG. 4(a). Rank-1 R-PDCCH may, for example, be configured by RRC signaling for RNs on the donor evolved Node B (DeNB) cell edge experiencing a relatively lower operational SINR point over the backhaul link. For rank one R-PDCCH transmission, port #0 can be configured for RN so that there is no need for blind detection over port #1.

Rank-2 R-PDCCH can be mapped to OS#3, 4 with 2 CCEs aggregation as illustrated in FIG. 4(b). Rank-2 R-PDCCH may, for example, be configured by RRC signaling for RNs within the DeNB cell experiencing a relatively higher operational SINR point over the backhaul link. The spared symbols OS#5, 6 in the 1st slot may then be used for the R-PDSCH.

Upon receiving higher layer signaling described above, the RN may know which rank is to be assumed for R-PDCCH blind detection. By limiting the number of possible CCE aggregation levels for a given rank, the amount of blind detection can be minimized. If multiple modulation schemes are to be supported for R-PDCCH, it would be possible to further link the modulation schemes and the CCE aggregation levels with the configured rank for R-PDCCH to minimize the blind detections.

A joint detector could, for example, be used when R-PDCCH and R-PDSCH are spatial division multiplex (SDMed) on the same symbols. An optimum joint detector would require the same modulation format over the two spatial layers to maximize Euclidean distance between the received symbol combination and the reference symbol combination. In case #1, if R-PDCCH and R-PDSCH have different modulation formats (for example, quadrature phase-shift keying (QPSK) and 16 quadrature amplitude modulation (QAM)/64QAM) a single minimum mean square error (MMSE) detector or a sub-optimum joint MMSE detector may be used in the R-PDCCH detection process. This is a particular case which may not be very likely, assuming case #1 applies to RNs on the DeNB cell edge with (a) single-layer R-PDSCH is more likely (R-PDCCH and R-PDSCH are only time division multiplex (TDMed) in this case and a single detector is used or (b) two-layer R-PDSCH with QPSK is more likely, due to relatively low signal to noise ratio (SNR).

Implicit DL assignment of resources in PRB containing R-PDCCH in SU-MIMO may be used. In this case, the DCI format may only indicate MSC configuration parameters, assuming a set of PRBs are allocated for R-PDSCH where the set of PRBs includes the ones containing R-PDCCH or assuming it does not include the ones containing R-PDCCH. The MCS configuration parameters for all the PRBs can be the same and can be indicated only once by the DCI format. Upon detection of the DCI in R-PDCCH, the RN can decide the TB size as described below. In any case, RN can assume the remainder of the symbols in the PRB are allocated to itself, if R-PDCCH is detected in that PRB. Thus, the resource allocation bits in the DCI need only indicate the set of PRBs that are assigned to R-PDSCH but not containing any R-PDCCH. In other words, the resource allocation bits in the DCI need only indicate "full" PRBs.

The situation of default configurations may also be considered. There are scenarios where the RN may not be able to get the R-PDCCH RRC configuration parameters and may need to blindly detect the R-PDCCH, assuming rank-1 and some pre-defined common search space shared by RNs experiencing similar conditions as follows. For example, during initial DeNB cell access the RN has not yet had the opportunity to get R-PDCCH RRC configuration via higher layer signaling. Similarly, during a scheduling request the RN may, after a relatively long period of inactivity, request new UL resources and wait for UL grant given by R-PDCCH. However, the RN may not use the R-PDCCH RRC configuration that the RN obtained while last active. This configuration (rank, CCE level, DM RS port, etc.) may be obsolete. Furthermore, during poor backhaul link reception the RN may be configured with rank-2 R-PDCCH and may not be able to receive the R-PDCCH reliably any more due to a sudden degradation over the backhaul (BH) link, that is, inter-RN interference.

A further consideration may be transport block (TB) size. In certain embodiments, the TB size in R-PDSCH is linked to the rank of the R-PDCCH, the CCE aggregation level, and the number of PRBs. In such embodiments, it is up to the DeNB to make use of the partial PRB in PRB #k that contains R-PDCCH. One possibility is that the DCI format would indicate by setting one bit to "1" that all the symbols not used by the R-PDCCH in the 1st slot PRB #k should be used by the RN for R-PDSCH. If the bit is set to "0", then R-PDSCH only in 2nd slot in PRB #k is scheduled by the DeNB. The DCI format may be optimized to optimize signaling efficiency, reduce impact on specification, and allow practical RN implementation.

In other embodiments DeNB will always use the symbols left by R-PDCCH within the 1st slot for the use of R-PDSCH. In such embodiments, the RN can determine the TB size based on the MCS index read from DCI and the number of PRBs allocated for R-PDSCH, that is, NPRB. In this case, RN can decide N_PRB in two possible ways. Either N_PRB can be equal to the number of PRBs indicated by resource allocation bits in DCI; or N_PRB is equal to the number of PRBs in the above plus the number of PRBs which contain R-PDCCH for the same RN. Under the first option, the PRBs may not include any PRBs containing R-PDCCH for the same RN, that is to say, "partial" PRBs.

The way that the RN uses to determine N_PRB can either be configured by the DeNB or predefined in a standard specification. Based on this rule, the DeNB can properly select MCS for the R-PDSCH in the subframe. The above configuration of RN behavior—if any—can either be via higher layer or be by L1 physical layer signaling. For the latter, only one more bit in DCI is needed.

Example embodiments of the invention for multiple user (MU) MIMO will now be described.

Figure 5:
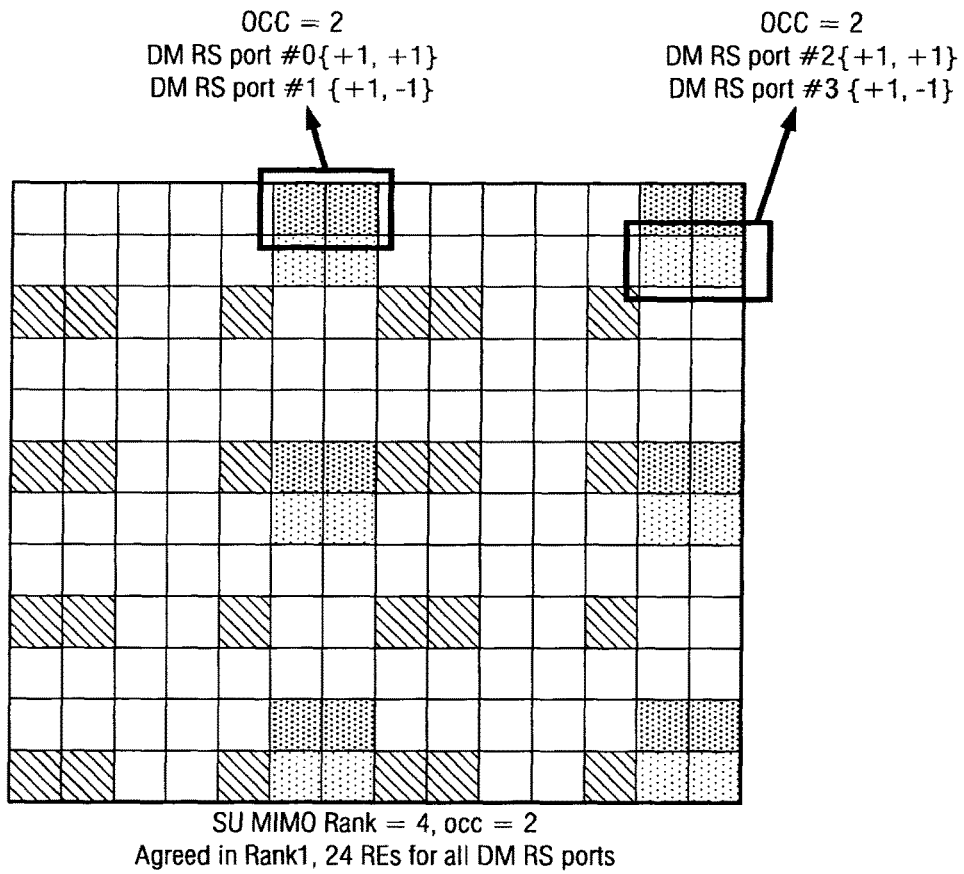
FIG. 5 illustrates an example implementation of DM RS ports.
Figure 5:
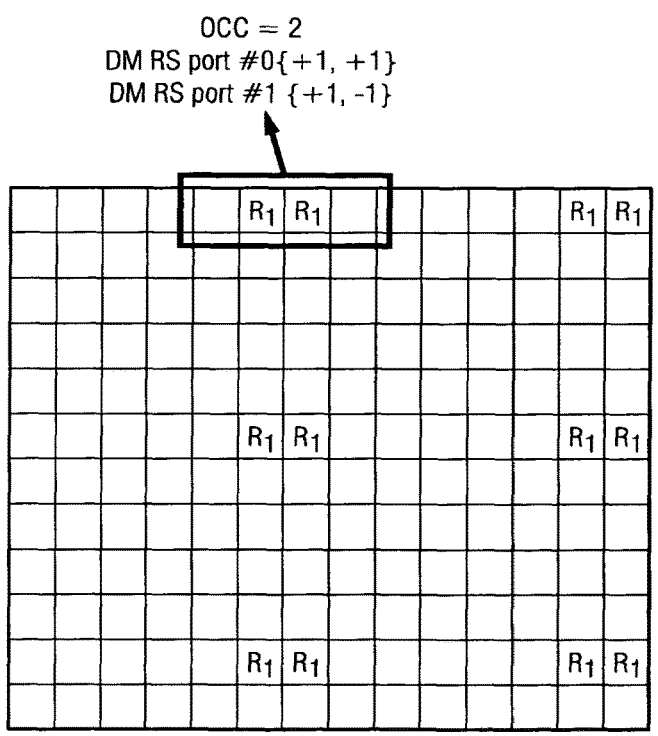

The R-PDCCH search space mechanisms outlined above for SU MIMO may readily be extended to MU MIMO. In an example embodiment, the MIMO work item (WI) concepts can be re-used as much as possible. In this sense, some informative discussions for the MU-MIMO cases over backhaul are provided. FIG. 5 provides an illustration of DM RS port integrating the DL MIMO WI concepts.

It may be in MU MIMO that the rank per User <=2 and the total rank for all UEs <=4. Transparent Mu MIMO is one option. In such an option, 12 resource elements (REs) for at most two DM RS port per UE may be used. Another UE's DM RS can be using a different sequence but mapping on the same REs. In certain instances, there may be no need to be aware of the existence of the other UE, as long as the scrambling sequence ID and orthogonal complementary code (OCC) index are known.

In certain embodiments of the present invention for MU MEMO over the BH link, the following may be implemented: transparent Mu-MEMO; RN #1 needs not know the existence of another RN #2 on the same PRB set; MEMO parameters can be configured via RRC while it is in DCI, which may avoid a chicken & egg problem; DMRS port (as illustrated in FIG. 3), that is scrambling sequence ID & OCC index; and Rank per RN.

Several cases are possible in practice: the single user (SU) case treated above; multiple user (MU), pure R-PDSCH in the PRB, RN #1 & RN #2 SDMed, rank per RN can be at most two; and MU, for certain RN, there could be R-PDCCH mapped to 1st slot, with rank one or two. In this last case, if rank one, the same layer and the other layer in 1st slot can be used for R-PDSCH of the same RN if in 2nd slot R-PDSCH is with rank two. If rank one, the same layer in the 1st slot can be used for R-PDSCH of the same RN. The other layer in the 1st slot can be used for R-PDSCH of a different RN if in the 2nd slot R-PDSCH is with rank one for the two RNs. Additionally, if rank two, for the RN R-PDSCH in 1st slot and 2nd slot will also be rank two.

For MU, rank per RN for R-PDSCH could be limited to 1 or 2. Rank for R-PDCCH can even be limited to one to allow better reuse of the Release 10 (Rel-10) DL MIMO WI concept.

Certain embodiments of the present invention can make a hybrid R-PDCCH/R-PDSCH multiplexing method stronger compared to the FDM R-PDCCH/R-PDSCH multiplexing alternatives. The following benefits are provided: R-PDCCH search space RRC configuration with less blind R-PDCCH detection needed for more practical RN implementation; higher granularity of CCE for R-PDCCH; spatial multiplexing of RNs allowed in the same PRB.

Figure 6:
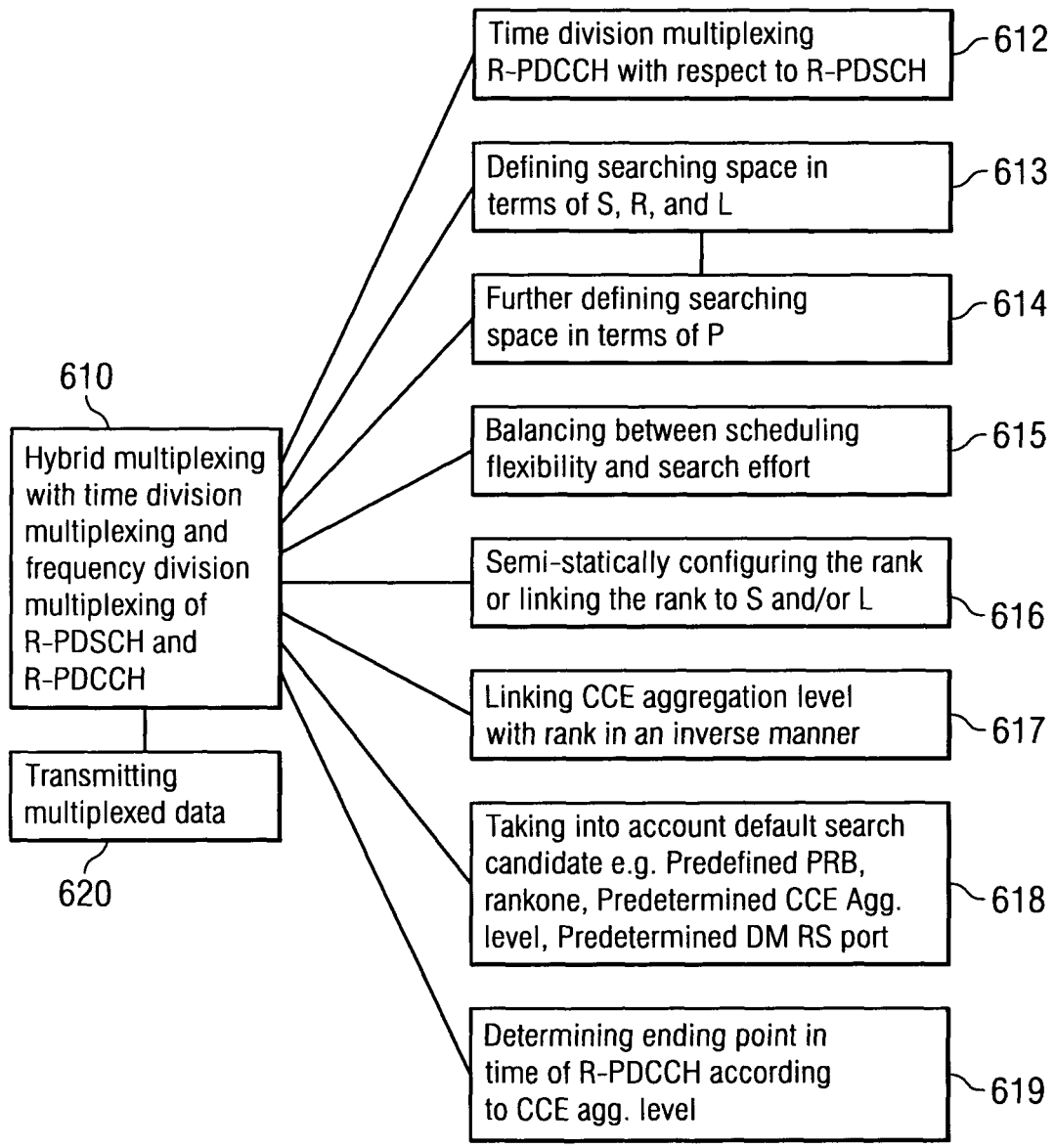
FIG. 6 illustrates a method according to certain embodiments of the present invention.

FIG. 6 illustrates a method according to certain embodiments of the present invention. The method of FIG. 6 includes hybrid multiplexing 610, with time division multiplexing and frequency division multiplexing a relay-physical downlink control channel and relay-physical downlink shared channel of a backhaul link for a relay node as a hybrid multiplexed set of symbols. The relay-physical downlink control channel comprises a searching space to be searched by the relay node. The method also includes transmitting 620 the hybrid multiplexed set of symbols to the relay node.

The relay-physical downlink control channel can be time division multiplexed 612 with respect to the relay-physical downlink shared channel. The relay-physical downlink control channel searching space can be defined 613 as a set of parameters including at least a physical resource block candidate set S, a rank for the relay-physical downlink control channel R, and control channel element aggregation level L. The relay-physical downlink control channel searching space can further be defined 614 by a demodulation reference signal port index P.

Balancing 615 between relay-physical downlink control channel scheduling flexibility and relay node search effort can be performed using the physical resource block candidate set.

The rank for the relay-physical downlink control channel can be semi-statically configured or linked 616 to another parameter selected from physical resource block candidate set S or the control channel element aggregation level L.

The control channel element (CCE) aggregation level is linked 617 with the rank for the relay-physical downlink control channel so that either a larger number of control channel elements are aggregated when rank of the relay-physical downlink control channel is low or a smaller number of control channel elements are aggregated when rank of the relay-physical downlink control channel is high. This may be referred to as linking 617 the rank and the CCE aggregation level in an inverse manner.

The search space can include a default search candidate, which can be taken into account 618 when hybrid multiplexing. The default search candidate can include predefined physical resources blocks, rank one, a predetermined control channel element aggregation level, and a predetermined demodulation reference signal (DM RS) port.

The ending point in time of a relay-physical downlink control channel can be determined 619 by a control channel element aggregation level.

The method of FIG. 6 can be implemented using a combination of hardware and software. In particular a computer-readable non-transitory medium can be encoded with instructions that, when executed in hardware, perform a process that corresponds to the method of FIG. 6. The non-transitory medium can be a medium that is not a transitory signal.

Figure 7:
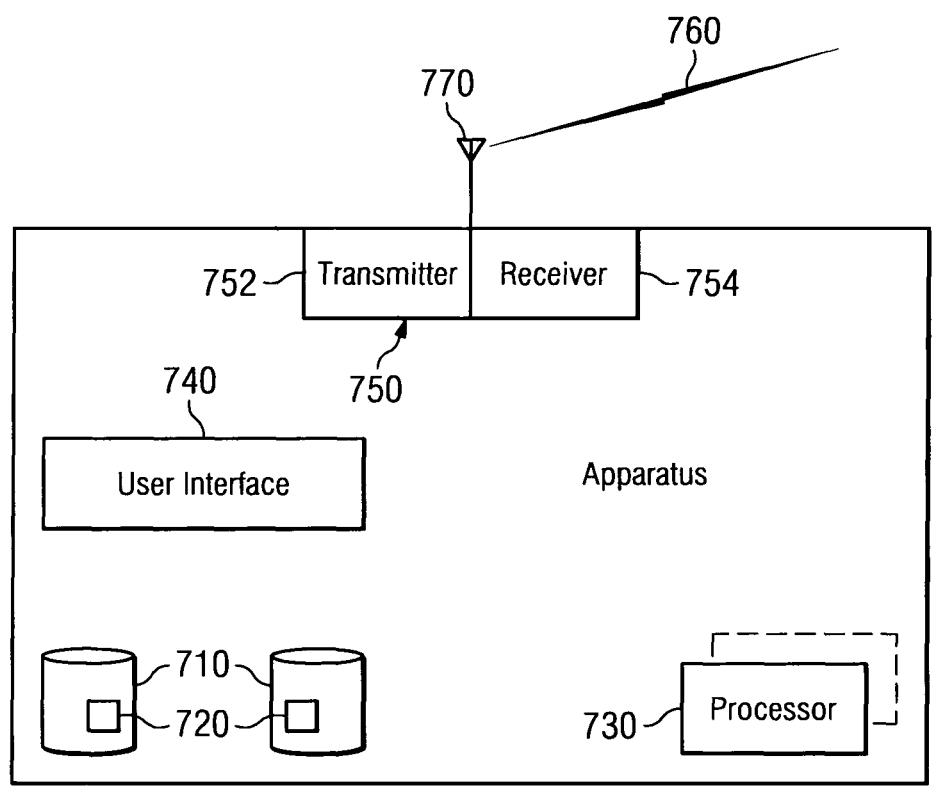
FIG. 7 illustrates an apparatus according to certain embodiments of the present invention.

FIG. 7 illustrates an apparatus, such as a relay node. The apparatus can include at least one memory 710 including computer program code 720. The apparatus can also include at least one processor 730.

The memory 710 may be any suitable information storage device, such as, but not limited to, a random access memory (RAM), read only memory (ROM), hard drive, compact disc drive, on-chip memory, or the like. The computer program code 720 may be a set of computer-readable instructions. The instructions may be the result of a compiled or interpreted computer-programming language. The processor 730 may be any suitable processing device. For example, the processor 730 can be a central processing unit (CPU), one or more controllers, or an application specific integrated circuit (ASIC).

The apparatus may also include additional hardware and software components such as optional user interface 740 and a transceiver 750. The transceiver 750 can include a receiver 752 and a transmitter 754, which may be configured to operate over a wireless link 760, using an antenna 770.

The at least one memory 710 and the computer program code 720 are configured to, with the at least one processor 730, cause the apparatus at least to perform a process, such as the process illustrated in FIG. 6. A donor evolved Node B (DeNB) may be constructed similarly to the apparatus of claim 7, although a user interface 740 may be less important in a DeNB. A DeNB may also include a wired interface to a core network, not illustrated in FIG. 7.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:

hybrid multiplexing, with time division multiplexing and frequency division multiplexing, a relay-physical downlink control channel and relay-physical downlink shared channel of a backhaul link for a relay node as a hybrid multiplexed set of symbols, wherein the relay-physical downlink control channel comprises a searching space with parameters semi-statically configured to be searched by the relay node; and transmitting the hybrid multiplexed set of symbols to the relay node, wherein the hybrid multiplexing comprises defining the relay-physical downlink control channel searching space by a set of parameters including at least a physical resource block candidate set, a rank for the relay-physical downlink control channel, and control channel element aggregation level, and wherein the hybrid multiplexing comprises configuring the rank for the relay-physical downlink control channel semi-statically or linking the rank to another parameter selected from the physical resource block candidate set or the control channel element aggregation level, and wherein the rank for the relay-physical downlink control channel or a rank for the relay-physical downlink shared channel has been set a limit for the relay node.

2. The method of claim 1, wherein the hybrid multiplexing comprises time division multiplexing the relay-physical downlink control channel with respect to the relay-physical downlink shared channel.

3. The method of claim 1, wherein the hybrid multiplexing further comprises further defining the relay-physical downlink control channel searching space by a demodulation reference signal port index.

4. The method of claim 1, wherein the hybrid multiplexing comprises balancing relay-physical downlink control channel scheduling flexibility and relay node search effort using the physical resource block candidate set.

5. The method of claim 1, wherein the hybrid multiplexing comprises linking the control channel element aggregation level with the rank for the relay-physical downlink control channel so that either a larger number of control channel elements are aggregated when rank of the relay-physical downlink control channel is low or a smaller number of control channel elements are aggregated when rank of the relay-physical downlink control channel is high.

6. The method of claim 1, wherein the hybrid multiplexing comprises configuring the search space, taking into account a default search candidate of the search space.

7. The method of claim 6, wherein taking into account the default search space comprises taking into account predefined physical resources blocks, rank one, a predetermined control channel element aggregation level, and a predetermined demodulation reference signal port.

8. The method of claim 1, wherein the hybrid multiplexing comprises determining the ending point in time of a relay-physical downlink control channel by a control channel element aggregation level.

9. The method of claim 1, wherein the hybrid multiplexing comprises linking a transport block size in the relay-physical downlink shared channel to the rank of the relay-physical downlink control channel.

10. The method of claim 1, wherein the hybrid multiplexing comprises setting a number of physical blocks for the relay-physical downlink shared channel either equal to a number of physical resource blocks indicated by resource allocation bits in downlink control information or equal to the number of physical resource blocks indicated by resource allocation bits in downlink control information plus a number of physical resource blocks that contain the relay-physical downlink control channel for a same relay node.

11. An apparatus, comprising:
at least one memory including computer program code; and
at least one processor,
wherein the at least one memory and the computer program code are configured to, with the at least one processor, cause the apparatus at least to
hybrid multiplex, with time division multiplexing and frequency division multiplexing, a relay-physical downlink control channel and relay-physical downlink shared channel of a backhaul link for a relay node as a hybrid multiplexed set of symbols, wherein the relay-physical downlink control channel comprises a searching space with parameters semi-statically configured to be searched by the relay node; and transmit the hybrid multiplexed set of symbols to the relay node, wherein the at least one memory and the computer program code are also configured to, with the at least one processor, cause the apparatus at least to define the relay-physical downlink control channel searching space by a set of parameters including at least a physical resource block candidate set, a rank for the relay-physical downlink control channel, and control channel element aggregation level, and wherein the at least one memory and the computer program code are also configured to, with the at least one processor, cause the apparatus at least to semi-statically configure the rank for the relay-physical downlink control channel or to link the rank to another parameter selected from the physical resource block candidate set or the control channel element aggregation level, and wherein the rank for the relay-physical downlink control channel or a rank for the relay-physical downlink shared channel has been set a limit for the relay node.

12. The apparatus of claim 11, wherein the at least one memory and the computer program code are also configured to, with the at least one processor, cause the apparatus at least to time division multiplex the relay-physical downlink control channel with respect to the relay-physical downlink shared channel.

13. The apparatus of claim 11, wherein the at least one memory and the computer program code are also configured to, with the at least one processor, cause the apparatus at least to further define the relay-physical downlink control channel searching space by a demodulation reference signal port index.

14. The apparatus of claim 11, wherein the at least one memory and the computer program code are also configured to, with the at least one processor, cause the apparatus at least to achieve a balance between relay-physical downlink control channel scheduling flexibility and relay node search effort using the physical resource block candidate set.

15. The apparatus of claim 11, wherein the at least one memory and the computer program code are also configured to, with the at least one processor, cause the apparatus at least to link the control channel element aggregation level with the rank for the relay-physical downlink control channel so that either a larger number of control channel elements are aggregated when rank of the relay-physical downlink control channel is low or a smaller number of control channel elements are aggregated when rank of the relay-physical downlink control channel is high.

16. The apparatus of claim 11, wherein the at least one memory and the computer program code are also configured to, with the at least one processor, cause the apparatus at least to take into account a default search candidate of the search space when hybrid multiplexing.

17. The apparatus of claim 16, wherein the at least one memory and the computer program code are also configured to, with the at least one processor, cause the apparatus at least to take into account, while hybrid multiplexing, characteristics of the default search candidate comprising predefined physical resources blocks, rank one, a predetermined control channel element aggregation level, and a predetermined demodulation reference signal port.

18. The apparatus of claim 11, wherein the at least one memory and the computer program code are also configured to, with the at least one processor, cause the apparatus at least to determine the ending point in time of a relay-physical downlink control channel by a control channel element aggregation level.

19. The apparatus of claim 11, wherein the at least one memory and the computer program code are also configured to, with the at least one processor, cause the apparatus at least to link a transport block size in the relay-physical downlink shared channel to the rank of the relay-physical downlink control channel.

20. The apparatus of claim 11, wherein the at least one memory and the computer program code are also configured to, with the at least one processor, cause the apparatus at least to set a number of physical blocks for the relay-physical downlink shared channel either equal to a number of physical resource blocks indicated by resource allocation bits in downlink control information or equal to the number of physical resource blocks indicated by resource allocation bits in downlink control information plus a number of physical resource blocks that contain the relay-physical downlink control channel for a same relay node.

21. A computer-readable non-transitory medium encoded with instructions that, when executed in hardware, perform a method according to claim 1.

22. A method, comprising:
receiving a hybrid multiplexed set of symbols at a relay node; and
hybrid de-multiplexing, with time division de-multiplexing and frequency division de-multiplexing, a relay-physical downlink control channel and relay-physical downlink shared channel of a backhaul link for the relay node as a hybrid de-multiplexed set of symbols,
wherein the hybrid de-multiplexing comprises searching the relay-physical downlink control channel with a searching space with parameters semi-statically configured to be searched by the relay,
wherein the hybrid de-multiplexing comprises searching the relay-physical downlink control channel searching space using a set of parameters including at least a physical resource block candidate set, a rank for the relay-physical downlink control channel, and control channel element aggregation level,
wherein receiving the hybrid multiplexed set comprises receiving the hybrid multiplexed set having the rank for the relay-physical downlink control channel semi-statically configured or having the rank linked to another parameter selected from the physical resource block candidate set or the control channel element aggregation level, and
wherein the rank for the relay-physical downlink control channel or a rank for the relay-physical downlink shared channel has been set a limit for the relay node.

23. The method of claim 22, wherein the hybrid de-multiplexing comprises time division de-multiplexing the relay-physical downlink control channel with respect to the relay-physical downlink shared channel.

24. The method of claim 22, wherein the hybrid de-multiplexing further comprises further search the relay-physical downlink control channel searching space using a demodulation reference signal port index.

25. An apparatus, comprising:
at least one memory including computer program code; and
at least one processor,
wherein the at least one memory and the computer program code are configured to, with the at least one processor, cause the apparatus at least to
receive a hybrid multiplexed set of symbols at a relay node; and
hybrid de-multiplex, with time division de-multiplexing and frequency division de-multiplexing, a relay-physical downlink control channel and relay-physical downlink shared channel of a backhaul link for the relay node as a hybrid de-multiplexed set of symbols,
wherein hybrid de-multiplexing comprises searching the relay-physical downlink control channel with a searching space with parameters semi-statically configured to be searched by the relay node,
wherein the at least one memory and the computer program code are also configured to, with the at least one processor, cause the apparatus at least to search the relay-physical downlink control channel searching space using a set of parameters including at least a physical resource block candidate set, a rank for the relay-physical downlink control channel, and control channel element aggregation level,
wherein the at least one memory and the computer program code are also configured to, with the at least one processor, cause the apparatus at least to receive the hybrid multiplexed set having the rank for the relay-physical downlink control channel semi-statically configured or having the rank linked to another parameter selected from the physical resource block candidate set or the control channel element aggregation level, and
wherein the rank for the relay-physical downlink control channel or a rank for the relay-physical downlink shared channel has been set a limit for the relay node.

26. The apparatus of claim 25, wherein the at least one memory and the computer program code are also configured to, with the at least one processor, cause the apparatus at least to time division de-multiplex the relay-physical downlink control channel with respect to the relay-physical downlink shared channel.

27. The apparatus of claim 25, wherein the at least one memory and the computer program code are also configured to, with the at least one processor, cause the apparatus at least to further search the relay-physical downlink control channel searching space using a demodulation reference signal port index.

28. A computer-readable non-transitory medium encoded with instructions that, when executed in hardware, perform a method according to claim 22.

* * * * *